Figure 1:
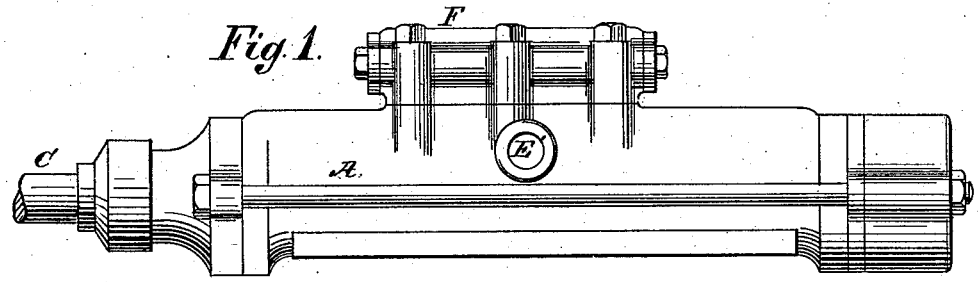

(No Model.) 2 Sheets—Sheet 1.

F. A. HALSEY.
STEAM ROCK DRILL.

No. 294,999. Patented Mar. 11, 1884.

Witnesses:
Henry Eisling
A. S. Fitch

Inventor
Frederic A. Halsey
W. Fitch,
atty.

(No Model.)  
F. A. HALSEY.  
STEAM ROCK DRILL.

No. 294,999. Patented Mar. 11, 1884.

Witnesses:  
Henry Eichling  
A. S. Fitch

Inventor  
Frederic A Halsey  
S. Fitch,  
atty.

UNITED STATES PATENT OFFICE.

FREDERIC A. HALSEY, OF NEW YORK, N. Y., ASSIGNOR TO THE RAND DRILL COMPANY, OF SAME PLACE.

STEAM ROCK-DRILL.

SPECIFICATION forming part of Letters Patent No. 294,999, dated March 11, 1884.

Application filed January 16, 1884. (No model.)

*To all whom it may concern:*

Be it known that I, FREDERIC A. HALSEY, of the city of New York, in the county and State of New York, and a citizen of the United States of America, have invented certain Improvements in Steam Rock-Drills and Analogous Machines, of which the following is a full, clear, and exact description, reference being had to the accompanying drawings, forming part of this specification.

My invention relates to steam rock-drills and analogous machines that are actuated by steam, compressed air, or other elastic fluid, all of which will be included in this specification under the name of "steam."

The invention consists in the herein described and claimed mechanism relating to the introduction, distribution, and control of the steam in said machines, whereby superior simplicity, strength, and durability of parts are secured and economy is attained in the use of steam.

In the full-working machine represented in the drawings, and which I will proceed to describe, beside the devices which I intend to claim herein, there are others relating to preventing the cushioning of the piston at the end of its working-stroke and utilizing the residual steam remaining in the upper end of the cylinder after the exhaust to assist in cushioning the piston at the end of its upward stroke and in propelling the piston in its downward stroke; but these are made the subject-matter of separate applications for patents, which I file simultaneously herewith.

The accompanying drawings represent a steam rock-drill embodying my improvement.

Figure 2:
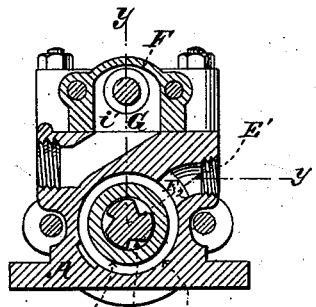
Figure 3:
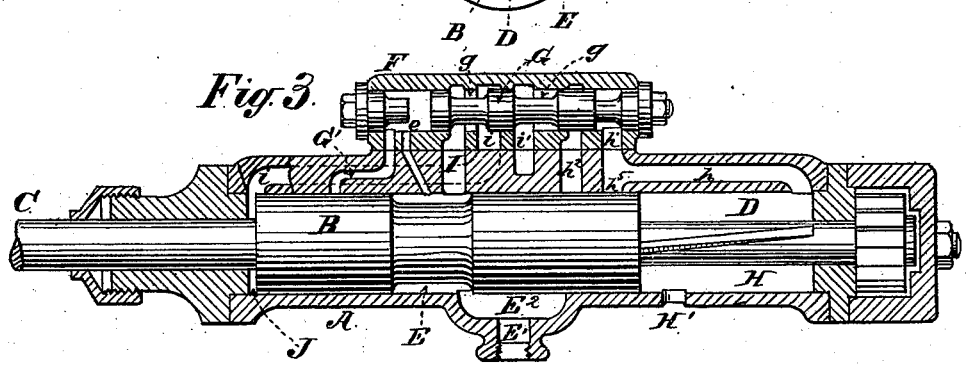
Figure 7:
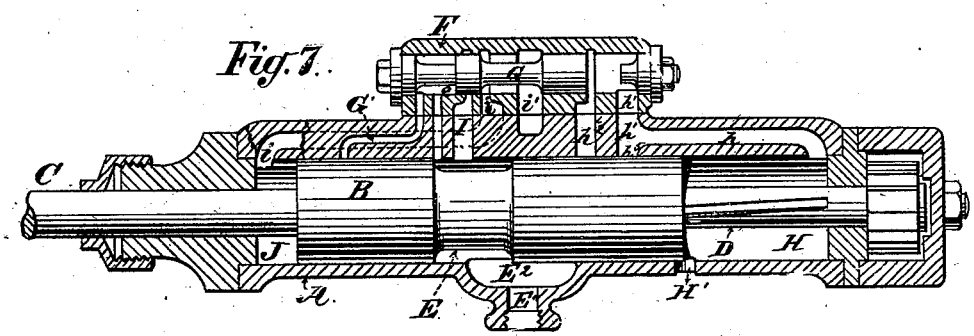
Figure 8:
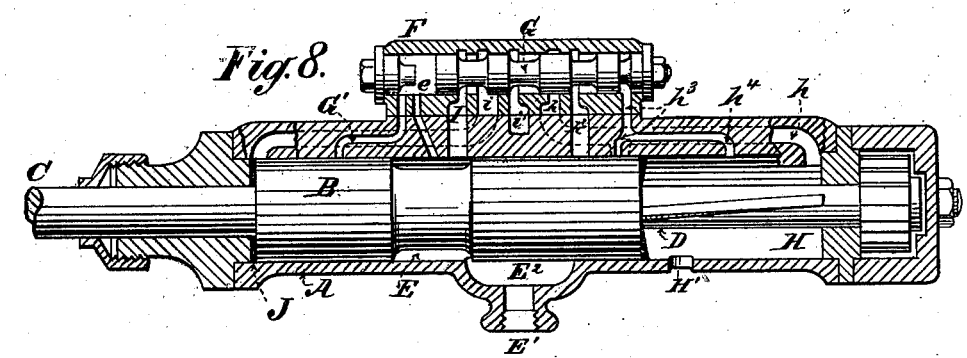

Figure 1 is a side elevation. Fig. 2 is a transverse section on the line $x\ x$, Fig. 4. Figs. 3, 4, 5, and 6 are longitudinal sections taken through the line $y\ y$, Fig. 2, respectively, showing the piston in elevation in various positions. For clearness of illustration the lower portions of Figs. 3, 4, 5, and 6 represent, as in a vertical plane, that portion of the line $y\ y$ which extends obliquely upward from the center of the cylinder and then horizontally outward through the nozzle, which is for connection with the steam-pipe. Fig. 7 illustrates a modification in the form of the valve and in the arrangement of the steam-passages from the cylinder to the valve-chest, which permits the employment of a piston-valve having but one circumferential groove. Fig. 8 is a modification, showing an arrangement of steam-passages adapted for the employment of a piston-valve having three circumferential grooves.

A is the cylinder, and B is the piston, which is elongated sufficiently to afford space for a steam-chest in its middle portion, and also to perform the function of opening and closing the steam-ports hereinafter described.

C is the piston-rod which carries the drill or tool, and D the spiral rod for effecting the rotation of the drill. The middle portion of the piston is circumferentially grooved, and the annular space E between the grooved portion of the piston and the wall of the cylinder serves as a steam-chest to receive steam through the nozzle E', which projects from the side of the cylinder, as shown in the drawings.

F is a valve-chest connected with the side of the cylinder, as shown; and G is a single cylindrical valve, fitted to work in a correspondingly-shaped chamber in said chest, which said valve is operated by steam introduced into said chest by ports leading from the steam-chest E. This valve is circumferentially grooved, thus forming annular spaces $g$ and $g'$, between the bottom of the grooves and the wall of the valve-chest. The valve-chest is also circumferentially grooved, forming annular spaces $g^4\ g^5\ g^6\ g^7$, Fig. 5. The cylindrical portions between the said annular spaces constitute valve-seats for the cylindrical portions $g^2$ and $g^3$ of the valve. As will be observed, this single valve, having its several cylindrical and grooved parts in the same axial line, and which is reciprocated by steam which acts only against its ends, performs the office of governing the induction-passages for distributing steam to both ends of the cylinder.

Figure 5:
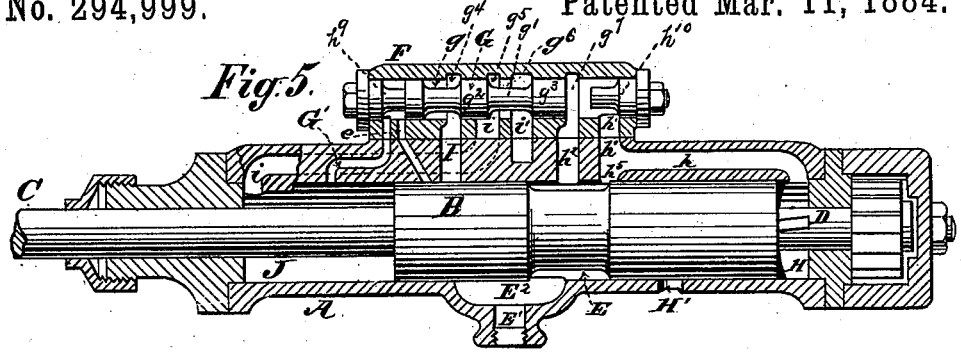

$h$ is the inlet-port, communicating between the upper end, H, of the cylinder and the upper end of the valve-chest. It opens into the cylinder at a point where it will communicate with the steam-chest E when the piston is at or near the end of its upward stroke, as seen in Fig. 5.

Figure 4:
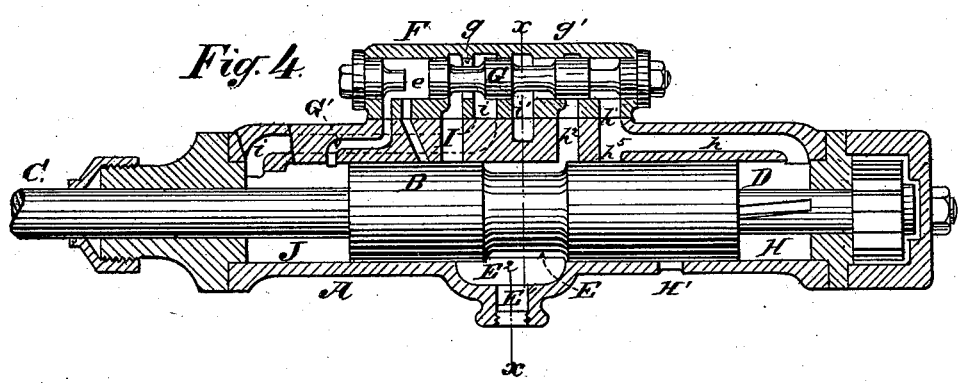

$h^2$ is a port communicating likewise between the steam-chest E in the cylinder A and valve-chest F, near its upper end, opening into the cylinder at a point where it will be uncovered and communicate with the steam-chest E when the piston has reached in its upward stroke the position shown in Fig. 4, and will be closed and the steam cut off from the upper end of the cylinder by the piston in its downward movement before it has reached the end of its downward stroke. In the drawings the inner mouth of this port is represented as located where it will be closed and the steam thereby cut off at about half-stroke; but it is obvious that its location may be varied, as may be desired, to shift the cut-off to any other point of the stroke.

i' is the exhaust-port leading from the valve-chest.

i is a steam-passage communicating between the lower end, J, of the cylinder and the valve-chest, as shown in the drawings, which I use as both an inlet and outlet port.

Figure 6:
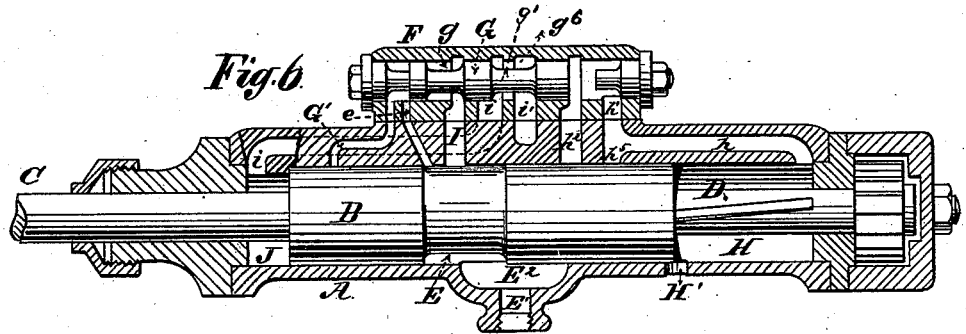

I is a port communicating between the cylinder and the valve-chest, and so located that it will be uncovered by the piston and communicate with the steam-chest E when the piston is in the position shown in Fig. 6, the steam being cut off from the lower end of the cylinder at the time that the lower edge of the circumferential groove in the piston passes the mouth of the port I, from which time, during the remainder of the upward stroke of the piston, the said port is maintained closed by the lower part of the piston, the steam therefore being used expansively during a portion of the said upward stroke of the piston.

e is a port communicating between the lower end of the valve-chest and the cylinder and located, as shown in the drawings, so as to be controlled by the portion of the piston below the circumferential groove; and G' is an exhaust-port communicating between the lower end of the valve-chest and the cylinder A, the same being also controlled by the said lower portion of the piston.

The ports $h^2$, i, and I, respectively, open into the spaces $g'$, $g^3$, and $g^4$ in the valve-chest. The said valve G is formed, as hereinbefore stated, of a single cylinder, of metal, circumferentially grooved, as shown in the drawings, the cylindrical parts fitting with steam-tight joints into the said valve-seats. The heads $h^9$ and $h^{10}$ of the valve-chest, at either end, against which the ends of the valve abut, project into the chamber with reduced diameters, thus respectively providing steam-spaces in the valve-chest at the ends of the valve when the valve is in contact with said heads, which communicate, respectively, with ports.

$E^2$ is a longitudinal groove or recess in the cylinder, communicating with the steam-chest E, formed in the cylinder by the circumferential groove, and into which opens the steam-supply pipe E', that communicates with the boiler. This groove $E^2$ permits the circumferential groove in the piston, and of course the piston itself, as well as the cylinder, to be made considerably shorter than it would otherwise have to be, in order to maintain constant communication between the pipe E' and the said steam-chest, and yet permit the piston to have the requisite length of stroke.

The operation of the said devices is as follows: Assuming the parts to be in the position shown in Fig. 3, the steam entering through the steam-chest E will pass through the port I into the port i, through the annular space formed by the groove g into the lower end, J, of the cylinder, and throw the piston upward. When the piston thus begins its upward movement, the steam from the steam-chest E is acting against the lower end of the valve G and holding it in the position shown in said figure, the exhaust-port G' being closed. As the piston moves upward, it will first close the port e, then the port I, cutting off the steam from the lower end, J, of the cylinder, from which point the steam will act expansively to accomplish the remainder of the upward stroke. It is obvious that the location of the inner mouth of port I may be varied to cut off steam from the lower end of the cylinder at any desired part of the upward stroke. The exhaust-port G' is also opened by this upward movement of the piston. When said piston has reached the position shown in Fig. 5, it will uncover the inner mouth, $h^2$, of the port h, and thereby admit steam into the upper end of the valve-chest, whereby the valve will be thrown downward into the position shown in Figs. 5 and 6, thus closing the communication through the annular space between the ports I and i, and opening communication through the annular space between i and i', thus closing the inlet-port to the lower end of the cylinder, even when the port I is opened by the piston, and opening the channel for exhausting from the lower end of the cylinder; also, by the uncovering of the port $h^2$, steam is admitted into the upper end, h, of the cylinder.

H' is an exhaust-port opening through the wall of the cylinder and controlled by the piston through which the steam exhausts from the upper end of the cylinder, it being uncovered by the piston just before the piston finishes its downward stroke, as shown in Fig. 6. On the lower end of the cylinder the steam exhausts through the passage i into the port i' through the annular space $g'$, which is opened by the downward shift of the valve in the position shown in Figs. 5 and 6. The piston will now begin its downward movement, and close successively the inner mouths of the ports h and $h^2$, thereby cutting off the steam from the upper end of the cylinder, when, of course, from this point the steam will act expansively to accomplish the remainder of the downward stroke. Then, as the piston continues its downward movement, it will uncover the port I, but as the communication between I and i is at the moment closed, steam is not then admitted to the lower end of the cylinder through said port $i$. The piston next uncovers the port $e$, after closing the exhaust-port G', steam being thus admitted to the lower end of the valve-chest from the steam-chest through said port $e$, and operating to throw the valve upward, the steam at the upper end of the valve-chest being at the moment exhausting through ports $h'$ and $h$ the upper end of the cylinder and exhaust-port H', by which movement of the valve communication is opened between I and $i$, and steam is again admitted into the lower end of the cylinder.

I have now described a machine in which is embodied my improvement, the essential characteristic of which is the employment, in combination with an elongated circumferentially-grooved piston, of a single steam-moved valve, by which, in connection with suitable steam-passages, steam is conducted to both ends of the cylinder, and is also cut off therefrom, so as to be used expansively, as described. But various modifications may be made in the induction-passages and form of the valve, while the said essential characteristic is preserved. As illustrations, I have represented two such modifications in Figs. 7 and 8.

As shown in Fig. 7, the valve G has but one circumferential groove, the upper or right-hand end of the valve is like that already described, but the lower or left-hand end consists of but one swell instead of two, being in that respect like the upper end. In the position shown the passage $i$ is in communication with the exhaust $i'$, as it is in Fig. 5. Communication between $i$ and the induction-port I is established when the valve moves to the right by the left-hand end of the valve registering with the right-hand edge of the port $i$.

Figure 8 represents a further modification in the valve, which consists in providing it with three circumferential grooves, so that each end of the valve consists of two swells. The left-hand end in this case is exactly the same as the one first described; but the right-hand end has two swells instead of one. In the position in which the parts are shown in Fig. 8 the piston has completed its working-stroke, the valve has been reversed, and the passage $i$ is in communication with the induction-port I. When the piston has moved upward sufficiently to uncover the lower leg of the passage $h^6$, steam is admitted from the steam-chest into the upper end of the valve-chest, the mouth of the upper leg, $h^5$, of the passage $h^6$ being at that time covered by the elongated upper end of the piston. By the admission of steam through the passage $h^6$ the valve is driven to the left and establishes communication between the induction-port $h^2$ and the passage $h$, leading to the upper end, H, of the cylinder. By this left-hand movement of the valve communication is also established between the passage $i$ and the exhaust $i'$.

In all the modifications of the form of the valves and the positions of the steam-passages and ports the distinguishing characteristics of the mode of operation are the same in respect of the facts that in each instance a single valve governs the distribution of steam to both ends of the main cylinder by opening the communication from the steam-chest and the ports, which respectively supply steam to the opposite ends of the cylinder, while the cutting off of the supply is in all cases effected by the movement of the main piston.

The germ of the two modified forms of valves and arrangements of passages and of other modified forms which will readily suggest themselves is contained in the form of valve first described, in which the left-hand end of the valve is double—that is, it has two swells—and the right-hand end single. In the form of the valve represented in Fig. 7 both ends are single, and in that represented in Fig. 8 both ends are double. It will of course be seen that the form of the original may be exactly reversed—that is, the left-hand end may be single and the right-hand end double. With the single-ended valve the steam passes through the end of the valve-chest on its way to the main cylinder, while with the double-ended valve it passes through the annular groove between the two swells, both of which methods of operation are characteristic of the form of valve first described.

It will be observed that the valve G is shifted downward by the difference in pressure between the live steam at its upper and the expanded steam at its lower end. The advantage of this operation is that while the valve is shifted quickly enough the force of its concussion against the lower end of the valve-chest is less than it would be if at the lower end there were no resistance to its downward movement, thus rendering the valves less liable to break or get out of order.

In three separate applications, numbered, respectively, 110,082, (filed October 26, 1883,) 117,723, and 117,724, the latter two filed simultaneously herewith, I have claimed several of the devices herein described, namely: In No. 110,082 I have claimed the means for controlling the transmission of steam for preventing its premature introduction to the lower end of the cylinder and the consequent cushioning of the piston thereon. In No. 117,723 I have claimed the means for confining and compressing the residual steam in the upper end of the cylinder, and in No. 117,724 I have claimed the combination of the means for preventing the premature introduction of steam to the lower end of the cylinder, with means for using steam expansively.

What I claim as my invention, and desire to secure by Letters Patent, is—

1. In a steam rock-drill or analogous machine, the cylinder, the elongated circumferentially-grooved piston, and the described means for distributing the steam to both ends of the cylinder, together with steam-induction passages leading from the said circumferential chamber of the piston, and located, one or all, relatively to the piston, as described, so that the piston, in its either stroke, closes the respective inlet-ports before it reaches the limit of its stroke, whereby the steam is used expansively during a portion of the stroke of the piston, as specified.

2. In a steam-rock drill or analogous machine, the cylinder and elongated circumferentially-grooved piston, and the induction and eduction steam passages for distributing steam to the cylinder, substantially as described, and the single circumferentially-grooved steam-moved valve working in the described chambered valve-chest, and co-operating with the piston to distribute the steam to both ends of the cylinder, all constructed and arranged to operate as and for the purpose specified.

3. In a steam rock-drill or analogous machine, the cylinder, the elongated circumferentially-grooved piston, the described circumferentially-grooved steam-moved valve in the described valve-chest, and the steam passages or ports located relatively to each other and to the piston and valve, as described, whereby, while said valve operates to control the distribution of steam to the ends of the cylinder, the piston operates directly as a cut-off to the inlet-ports, as specified.

4. The combination, in a steam rock-drill or analogous machine, of the cylinder A, the elongated circumferentially-grooved piston B, valve-chest F, single valve G, the steam-inlet port I, and the exhaust-passage $i'$, and the passage $i$, which serves both as an induction and eduction port for the lower end of the cylinder, substantially as and for the purpose specified.

5. In a steam rock-drill or other analogous machine, the combination of the cylinder A, elongated circumferentially-grooved piston B, single valve G, valve-chest F, and the steam-inlet port $e$, controlled directly by the said piston, and communicating between the steam-chest E, formed by the circumferential groove in the piston and the lower end of the valve-chest, whereby steam is introduced into the lower end of said valve-chest from the said steam-chest in the cylinder, as and for the purpose described.

6. In a steam rock-drill or other analogous machine, the combination of the cylinder A, elongated circumferentially-grooved piston B, valve G, and the valve-chest F, with the steam-passage $h$ opening at one end into the upper end of the cylinder, and at the other end into a branch passage, $h'$, controlled by the piston, and opening at one end into the upper end of the valve-chest, and at the other end into the cylinder, whereby steam is introduced from the steam-chest in the piston, both into the upper end of the cylinder and the upper end of the valve-chest, substantially as and for the purpose described.

7. The cylinder provided with the longitudinal groove $E^2$, and the supply-pipe $E'$, communicating therewith, and the elongated piston provided with the circumferential groove, forming a steam-chest in the cylinder communicating with said groove $E^2$, as and for the purpose described.

8. In a steam rock-drill or analogous machine, the cylinder, the elongated circumferentially-grooved piston, and the described means for distributing the steam to the cylinder, the combination, with the piston, of an inlet-passage to conduct steam from the circumferential chamber in the piston, to be distributed to the upper end of the cylinder, said passage being governed by the piston, and located relatively thereto, as described, so that the piston, in its upward stroke, closes said passage before reaching its termination, whereby the steam is used expansively during a portion of the upward stroke, as specified.

9. In combination with a steam-moved valve, means for introducing live steam into one end of the valve-chest, while the other end of the valve-chest is in communication with the end of the main cylinder containing expanded steam, whereby the valve is moved by the excess of the pressure of live steam acting upon one end of it over the pressure of expanded steam acting upon the other end of it.

FREDERIC A. HALSEY.

Witnesses:
A. G. N. VERMILYA,
A. S. FITCH.